United States Patent [19]

Lugo

[11] Patent Number: 5,404,736
[45] Date of Patent: Apr. 11, 1995

[54] ATTACHABLE VEHICLE HAND BRAKE LOCK ASSEMBLY

[76] Inventor: Nicolas R. Lugo, 1521 Bellevue Ave. #105, Seattle, Wash. 98122

[21] Appl. No.: 169,776

[22] Filed: Dec. 17, 1993

[51] Int. Cl.⁶ .............................................. G05G 5/00
[52] U.S. Cl. ......................................... 70/168; 70/172; 70/202; 70/230; 70/246; 70/422; 70/DIG. 58; 411/269; 411/321; 411/948
[58] Field of Search .................. 70/158, 163, 166–173, 70/245–247, 201–203, 229–232, 422, DIG. 58; 411/269, 433, 321, 948

[56] References Cited

U.S. PATENT DOCUMENTS

| | | | |
|---|---|---|---|
| 905,294 | 12/1908 | DeGroff et al. | 411/269 |
| 1,719,069 | 7/1929 | McGlynn et al. | 411/948 X |
| 2,855,970 | 10/1958 | Neuschotz | 411/948 X |
| 4,231,241 | 11/1980 | Lipski | 70/245 X |
| 4,835,999 | 6/1989 | Chant | 70/238 |
| 4,858,451 | 8/1989 | Balina et al. | 70/202 |
| 5,020,390 | 6/1991 | Chang | 74/608 |
| 5,311,756 | 5/1994 | Villani | 70/247 |

*Primary Examiner*—Lloyd A. Gall
*Attorney, Agent, or Firm*—Dean A. Craine

[57] ABSTRACT

An attachable vehicle hand brake lock assembly capable of being selectively attached over the end of a push button-activated hand brake to prevent its release. The lock assembly includes a cylindrical shaped body designed to be placed longitudinally over the upward extending end of the hand brake handle. The body includes an upper lock, a central threaded section, and a lower, threaded clamping section. The lock assembly also includes an outer sleeve with internal threads capable of being interconnected with the threads on the body enabling the sleeve to be moved upward and downward over the body during use. When initially attached to the handle, the lower section which is made up of two clamping arms is slanted and biased outward away from the outer surface of the handle to enable the lock assembly to slide easily over the handle. When the sleeve is rotated and moved downward over the clamping arms, their inner surfaces are forced inward against the handle to hold the lock assembly in place thereon. Two locking bars which slide in longitudinally aligned channels formed on the outer surface of the body and the inner surface of the sleeve, are also provided that interconnect with a lock housed inside the upper section of the body. By activating the lock, rotational movement of the sleeve over the body may be controlled.

9 Claims, 3 Drawing Sheets

ATTACHABLE VEHICLE HAND BRAKE LOCK ASSEMBLY

BACKGROUND OF THE INVENTION

1. Field of the Invention

This invention relates to security devices for motor vehicles, and more particularly to lock assemblies capable of being selectively attached to lever-type hand brakes to prevent their release.

2. Description of the Related Art

Lever-type hand brakes are commonly used today in both luxury and non-luxury automobiles. Typically, such hand brakes have a pushbutton located at one end of the handle which the driver presses to release the hand brake after being engaged.

Heretofore, locks have been developed for lever-type hand brakes which prevent activation of the pushbutton. Such locks have included a moveable release member which communicates with the pushbutton to control its activation. By securely attaching the lock to the hand brake and locking the release member in a stationary position, movement of the pushbutton can be prevented.

In Balina, (U.S. Pat. No. 4,858,451) a lock for the handle of a lever-type hand brake is disclosed comprising a sleeve which is fixed to the handle which has a longitudinally displaceable release member located inside that communicates with the pushbutton on the handle of the hand brake. One problem with such locks is that they can be accidentally engaged while driving. To prevent accidental engagement, the lock includes a means to arrest the lock in an unlocked condition after release of the hand brake and to prevent shifting out of this condition while driving. In the Balina's lock, this means comprises a projection located on the housing of the lock which cooperates with the cap to hold the cap in an arrested position.

Another means to prevent accidental engagement of the lock while driving is to design the lock so that it may be selectively attachable and removable from the handle. In order for such locks to act as vehicle anti-theft devices, however, the means used to attach the lock to the handle must be theft proof.

SUMMARY OF THE INVENTION

It is an object of the present invention to provide for a selectively attachable lock assembly for a lever-type hand brake.

It is an object of the present invention to provide such a lock assembly which when attached to the handle of a standard lever hand brake, acts as a vehicle anti-theft device.

It is another object of the present invention to provide such a lock assembly that when attached to the handle of the hand brake, covers the brake releasing means and prevents access thereof.

It is a further object of the present invention to provide such a lock assembly that will not physically damage or require modification of the handle of the hand brake, and is easy to operate and economical to manufacture.

These and other objects of the invention are met by providing an attachable vehicle hand brake lock assembly capable of being selectively attached over the end of a push-button-activated, lever-type hand brake to prevent access of the pushbutton. By preventing access to the pushbutton after the hand brake has been engaged, release of the hand brake is prevented.

The attachable vehicle hand brake lock assembly includes a cylindrical shaped body and a rotatably attached outer sleeve. The body is designed to be longitudinally aligned and placed over the handle completely covering the upward extending end thereof. The body includes a central passageway closed at one end which has has a sufficient diameter and length so that the body covers the pushbutton located on the upper end of the handle and a sufficient amount of the outer surface of the handle for gripping by the clamping arms. Located on the upper section of the body is a housing which holds a locking means, such as a key lock, which can be activated by the user to lock or unlock the lock assembly on the handle during use.

The central and lower sections of the body has external threads manufactured thereon which interconnect with the internal threads located on a rotating sleeve discussed further below. The lower section of the body acts as a clamping means to securely hold the lock assembly in place on the handle of the hand brake. In the preferred embodiment, the clamping means includes two clamping arms located on opposite sides thereof which may be deformably axially aligned by the sleeve and forced inward to press against the outer surface of the handle during operation. The clamping arms are designed so that they are aligned in an outward biased position when initially attached to the handle. As such, the lateral surfaces of each clamping arm are substantially parallel to the outer surface of the handle while the axially aligned inner and outer surfaces of the clamping arms are slanted outward. When the sleeve is attached to the external threads on the body and moved downward over the lower section, the clamping arms are forced inward and press the curved inner surfaces of each clamping arm against the outer surface of the handle to securely hold the body and the entire lock assembly thereon.

To prevent movement of the sleeve over the body, a sleeve locking means is disposed between the body and the sleeve. In the preferred emodiment, the sleeve locking means includes longitudinally aligned bars which are moveable along the outer surface of the body which function to allow or prevent rotation of the sleeve over the body. Two locking bars are used with the invention which are located in two longitudinally aligned channels formed on the outer surface of the central and lower sections of the body and the inner surface of the sleeve. Located at the distal end of each locking bar are teeth complementary in orientation, size and spacing with the internal and external threads located on the sleeve and body, respectively. When the channels located on the body and sleeve are properly aligned, the locking bars may be moved longitudinally within the channels so that the teeth on the locking bars can be moved between an aligned or offset positions with the threads of the sleeve and body. When the teeth of the locking bars and threads are aligned, the sleeve may be rotated clockwise or counter-clockwise over the body thereby enabling it to be moved upward and downward, respectively, thereover. When the teeth of the locking bars and the threads are offset, rotation of the sleeve is prevented thereby locking it in position on the body.

The proximal ends of each locking bar are interconnected with the gear that extends traversely from the locking means. By activating the locking means, the gear moves the locking bars longitudinally within the channels to place the teeth in an aligned or offset position with the threads to selectively control rotation of the sleeve over the body. By moving the sleeve downward over the clamping arms and selectively moving the locking means to prevent rotation of the sleeve member on the body, the lock assembly may be securely attached to handle. Since the body prevents access to the pushbutton located at the upper end of the handle, the lock assembly can be used as an anti-theft device.

DESCRIPTION OF THE PREFERRED EMBODIMENT(S)

Figure 1:
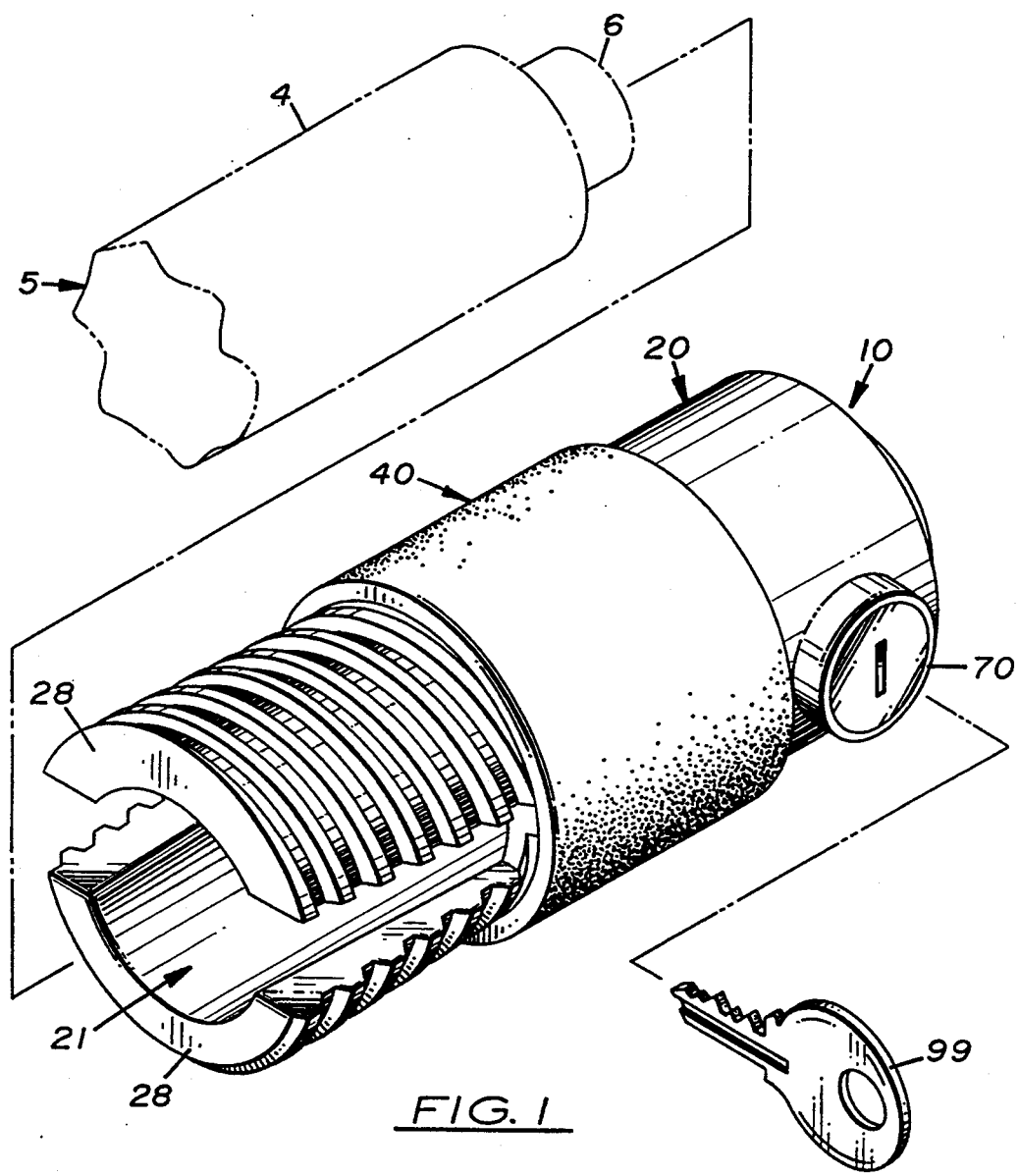
FIG. 1 is a perspective view of the attachable vehicle hand brake lock assembly.

As shown in the accompanying FIGS. 1–6b, there is shown an attachable vehicle hand brake lock assembly, generally referred to as 10, designed to be selectively attached over the upper end of the handle 4 of a standard lever-type hand brake 5 thereby blocking access to the pushbutton 6 used to release the hand brake 5.

The attachable vehicle hand brake lock assembly 10 includes a cylindrical shaped body 20 designed to be longitudinally aligned and placed over the upward extending end of the handle 4. The body 20, which is made of durable, plastic or nylon material, includes a central, longitudinally aligned passageway 21. The diameter of the passageway 21 is sufficient to enable the handle of a standard hand brake to be inserted therein. In the preferred embodiment, passageway 21 is approximately 1½ inches in diameter so that handles between 1¼ to 1½ inches in diameter may be used with the lock 10. It should be understood, however, that passageway 21 may have different diameters to accomodate other sizes of handles. The body 20 and passageway 21 also have sufficient length so that when the body 20 is placed over the distal end of the handle 4, the body 20 extends a sufficient distance over the handle 4 to create a gripping surface and to completely cover the pushbutton 6. In the preferred embodiment, the body 20 is approximately 4¾ inches in length and 2¾ inches in width across the upper section 22.

Figure 2:
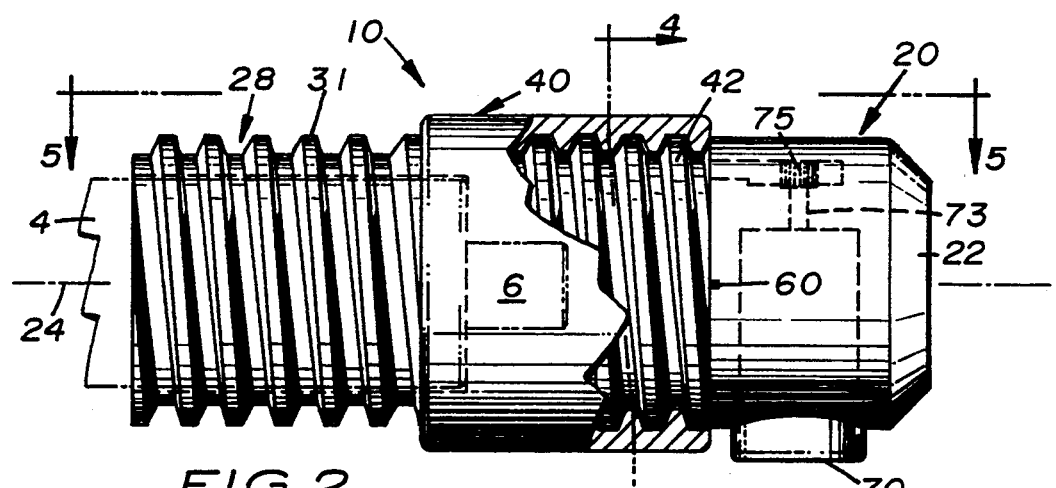
FIG. 2 is a top plan view of the attachable vehicle hand brake lock assembly

The upper section 22 of the body 20 acts as a housing for holding a locking means placed therein. As shown in FIG. 2, in the preferred embodiment, the locking means is a standard key lock 70 which is controlled by a key 99. The key lock 70 is traversely aligned in the body 20 so that the rearward projecting axle 73 is aligned perpendicular to the longitudinal axis 24 of the body 20 and the locking bars 50 discussed further below. During operation, the key lock 70 is used by the user to selectively rotate the gear 75 which in moves the locking bars 50 longitudinally over the body 20.

Figure 3:
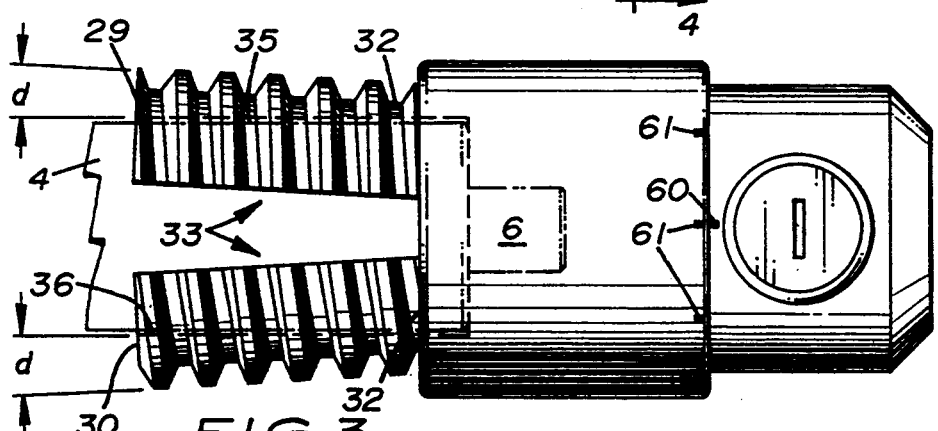
FIG. 3 is a left side elevational view of the attachable vehicle hand brake lock assembly.

The central and lower sections 25, 28, respectively, of the body 20 have external threads 31 manufactured thereon. In a preferred embodiment, the central and lower sections 25, 28, respectively are each approximately 1¾ inches in length. The lower section 28 is designed to act as a clamping means for securely holding the body 20 on the handle 4 without damaging the outer surface of the handle 4. The lower section 28 comprises two clamping arms 29, 30 located on opposite sides of the body 20. The two clamping arms 29, 30 are separated by two longitudinally aligned cutouts 33. As shown in FIG. 3, when initially attached to the body 20, outer surfaces of the clamping arms 29, 30, are slanted outward. The curved inside surfaces 35, 36 of the clamping arms 29, 30, respectively, when viewed from the side, as shown in FIG. 3, are substantially parallel to the outer surface of the handle 4. Each clamping arm 29, 30 are designed so that the area adjacent to the central section is reduced in thickness which allows each clamping arm 29, 30 to pivot inward a distance "d". In the preferred embodiment, the clamping arms are sufficiently flexible so that theirs ends are able to pivot approximately 1/8 inch about pivot point 32.

Sleeve 40 is cylindrical in shaped and approximately one-third the length of the body 20. The sleeve 40 has top and bottom openings with internal threads 42 manufactured therein which are capable of attaching to the external threads 31 located on the body 20. The sleeve 40 must have sufficient length so that the outward extending blocking teeth 52 located on the distal ends 50a of the locking bars 50 are covered when the sleeve 40 is rotated downward over the clamping arms 29, 30. In the preferred embodiment, the sleeve 40 is approximately 1½ inches in length and made of durable PVC plastic, nylon, or aluminum material with an outer textured surface to improve gripping.

During operation, the sleeve 40 is attached to the body 20 by interconnecting its internal threads 42 with the external threads 31. When the sleeve 40 is manually rotated counter-clockwise over the body 20, it moves downward over the clamping arms 29, 30, forcing the inside surfaces 35, 36 of the clamping arms 29, 30, respectively, against the outer surface of the handle 4 to securely hold the body 20 in place over the handle 4. When the sleeve 40 is rotated clockwise and moves upward over the central region 25 of the body 20, the clamping arms 29, 30 return to their outward slanted position to enable the body 20 to be freely moved longitudinally over the handle 4 for easy removal therefrom.

To prevent removal of the body 20 from the handle 4, the sleeve 40 is locked in position over the clamping arms 29. As shown in FIGS. 4, 5a, 5b, 6a, 6b, two locking bars 50 are placed in two longitudinally aligned channels 54 formed on the outer surface of the central section 25 of the body 20. The locking bars 50 extend longitudinally along the body 20 from the lock gear 75 of the lock 70 to approximately the midline of the body 20. In the preferred embodiment, the locking bars 50 are both located on the side of the body 20 so that their proximal ends may be interconnected to the gear 75 located on lock 70. The locking bars 50 are spaced apart and placed on opposite sides of the gear 75 of lock 70. A row of small teeth 51 are manufactured on the inside surface of each locking bar 50 near the proximal end 50b which interconnect with teeth located on the gear 75. The row of teeth 51 are located on facing sides of the locking bars 50 so that the locking bars 50 move longitudinally in the channels in opposite directions when the gear 75 is rotated.

Figure 4:
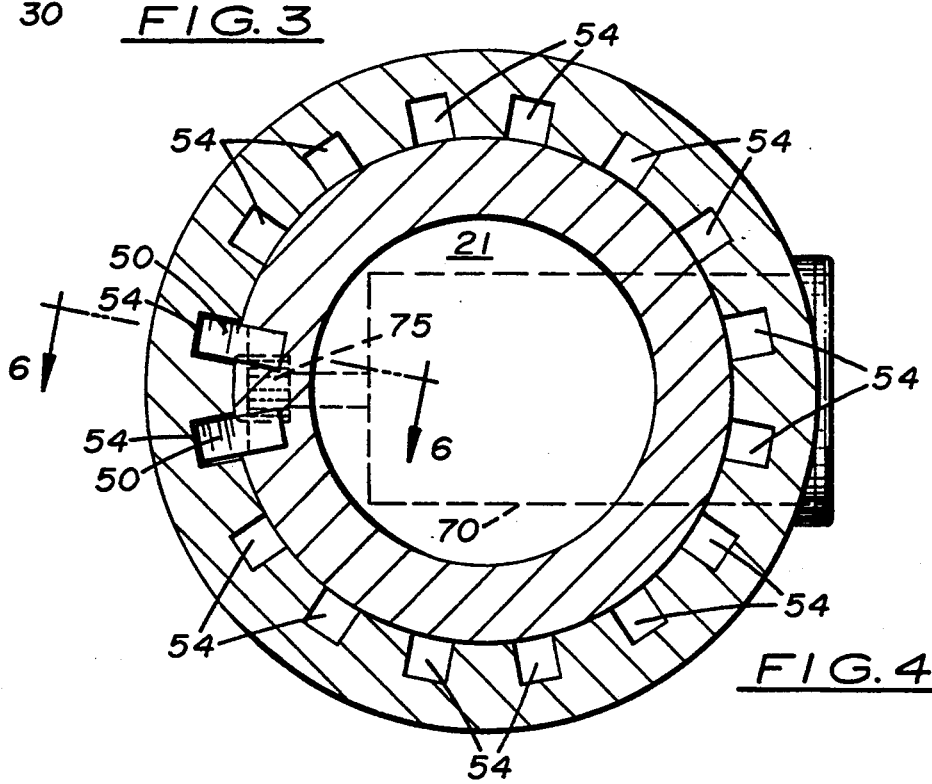
FIG. 4 is an elevational view of the attachable vehicle hand brake lock assembly taken along line 4—4 in FIG. 2.

As shown in FIG. 4, several pairs of channels 54 are manufactured on the inside surface of the sleeve 40. Channels 54 are aligned and space apart so that the locking bars 50 can be move longitudinally within channels 54 located on the body 20. In the preferred embodiment, eight pairs of channels 54 are provided on the inside surface of the sleeve which are spacially aligned approximately 45 degrees. During use, the sleeve 40 is rotated over the clamping arms 29, 30, until the desired amount of pressure is exerted by the clamping arms 29, 30 against the outer surface of the handle 4. If a pair of channels 54 is not aligned with the locking bars 50, the sleeve 40 must be further rotated until a pair of channels 54 is aligned with the locking bars 50. To assist the user in aligning the outer channel 54 with the locking bars 50, eight secondary alignment markings 61, are provided on the outer surfaces of the sleeve 40, which are aligned with the primary alignment marking 60 on the body 20.

Figure 5A:
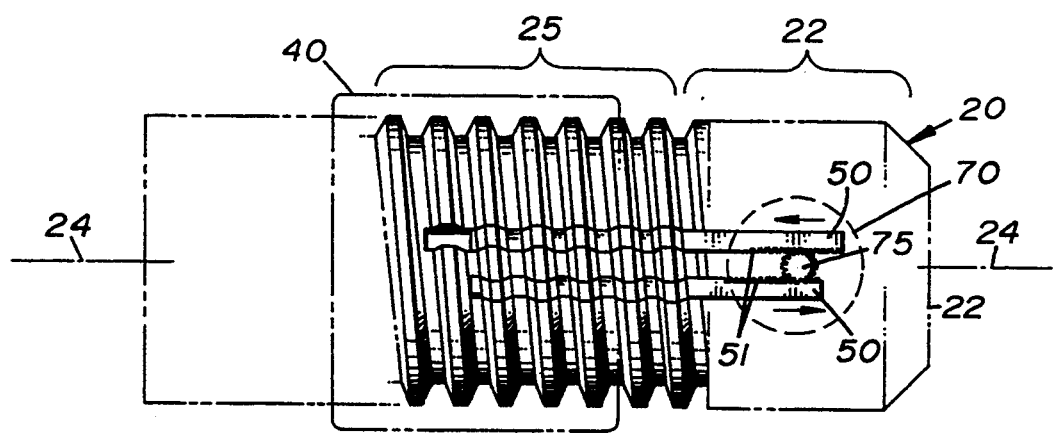
FIG. 5a is an elevational view in section of the attachable vehicle hand brake lock assembly taken along line 5—5 in FIG. 2 showing the locking bars in an aligned position.
Figure 5B:
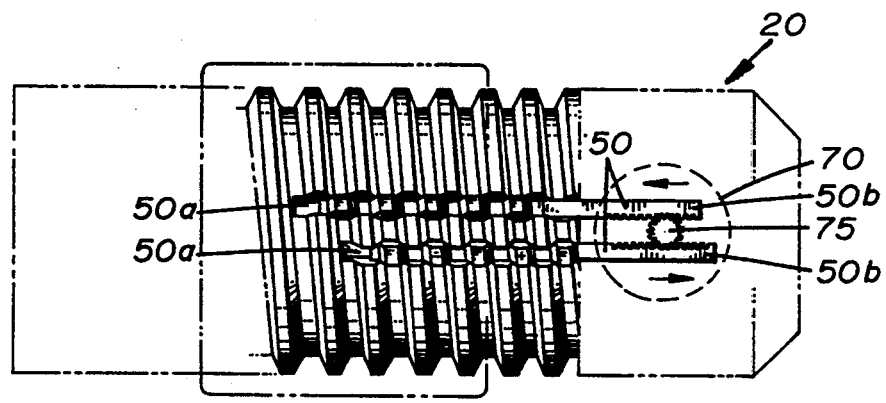
FIG. 5b an elevational view in section of the attachable vehicle hand brake lock assembly taken along line 5—5 in FIG. 2 showing the locking bars in offset position.
Figure 6A:
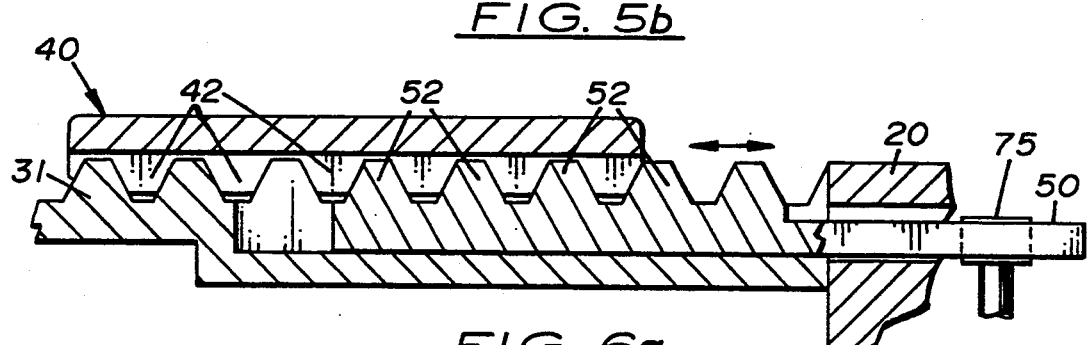
FIG. 6a is an elevational view of the attachable vehicle hand brake lock assembly taken along line 6—6 in FIG. 4 showing the locking bars in an aligned position.
Figure 6B:
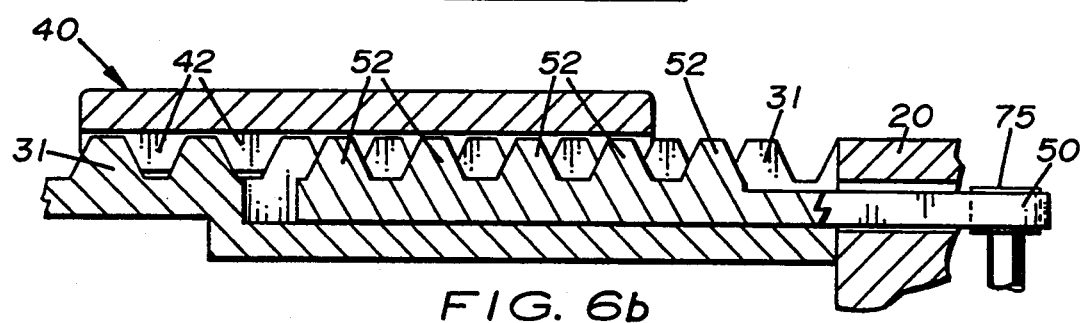
FIG. 6b is an elevational view of the attachable vehicle hand brake lock assembly taken along line 6—6 in FIG. 4 showing the locking bars in an offset position.

As shown in FIGS. 5a and 5b, the locking bars 50 extend from the upper section 22 downward across the central section of the body 20. Manufactured near the distal end 50a of each locking bar 50 are outward extending blocking teeth 52 complementary in size, shape, and spacing with the cross-section of threads 31, 42 located on the body 20 and sleeve 40, respectively. When the body 20 and sleeve 40 are properly aligned, the lock 70 is activated to move the locking bars 50 within the channels 54 so that the blocking teeth 52 are moved between aligned and offset positions with the threads 31, 42. As shown in FIGS. 5a, 5b, 6a, and 6b, when the blocking teeth 52 are aligned with the threads 31, 42, the sleeve 40 can be freely rotated and moved upward and downward over the body 20. When the blocking teeth 52 are moved to an offset position, the sleeve 40 is prevented from rotating on the body 20. By using the lock 70 to selectively move the locking bars 50 between the two positions, a user is able to move the blocking teeth 52 between two positions and thereby control movement of the sleeve 40 over the body 20. When the sleeve 40 is moved downward over the clamping arms 29, 30, and locked in position, access to the pushbutton 6 on the handle 4 of the hand brake 5 is prevented.

In operation, the handle 4 is pulled upward to engage the hand brake 5. The key 99 is placed in the lock 70 to place it in an unlocked state. The sleeve 40 is then rotated upward over the body 20 so that the upper surface of the sleeve 40 is placed adjacent to the upper section 22 to ensure that the clamping arms 29, 30 are slanted outward. The lock assembly 10 is then placed over the handle 4 to conceal the pushbutton located on the end of the handle 4 by inserting the end of the handle 4 through the central passageway 21. The lock 70 is then turned so that the blocking teeth 52 on the locking bars 50 are aligned with the threads 31, 42 on the body 20 and sleeve 40, respectively. The sleeve 40 is rotated and moved downward over the body 20 to force the clamping arms 29, 30 against the outer surface of the handle 4. The sleeve 40 is then tightened until lock assembly 10 is securely attached to the handle 4 or until the alignment markings 60, 61 are aligned. Once tightend and aligned, the key 99 is then turned to move the locking bars 50 so that the blocking teeth 52 are placed in an offset position with threads 31, 42 to prevent further rotation of the sleeve 40 over the clamping arms 29, 30. When the key 99 is removed from the lock 70, the lock assembly 10 operates as an anti-theft device. To remove the lock assembly 10 from the handle 4, the above steps are reversed.

In compliance with the statute, the invention has been described in language more or less specific as to structural features. It should be understood, however, that the invention is not limited to the specific features shown since the means and construction shown comprises the preferred forms of putting the invention into effect. The invention is, therefore, claimed in any of its forms or modifications within the legitimate and valid scope of the amended claims, appropriately interpreted in accordance with the doctrine of equivalents.

I claim:

1. An attachable vehicle hand brake lock assembly, comprising:
    a. a cylindrical-shaped body, said body having a longitudinal axis and a central passageway opened at one end manufactured therein, said body being sufficient length and said central passageway having sufficient diameter to enable said body to be placed over an upper end of a handle of a lever-type hand brake to cover a pushbutton release member located thereon, said body including an upper section, a central section, and a lower section, said central and lower sections having external threads formed thereon, said lower section being inwardly deformable and capable of being forced inward against the outer surface of said handle placed inside said passageway to securely hold said body thereon;
    b. a sleeve capable of being rotatably attached to said external threads on said body;
    c. a sleeve locking means disposed between said body and said sleeve, said sleeve locking means capable of being selectively moved to allow said sleeve to be rotated thereon or prevented from rotating on said body, and;
    d. a locking means disposed between said sleeve locking means and said body capable of locking said sleeve locking means in a position that prevents said sleeve from rotating on said body, said locking means including means to connect said locking means to said sleeve locking means.

2. An attachable vehicle hand brake lock assembly as recited in claim 1, wherein said sleeve locking means includes a plurality of longitudinally aligned channels formed along the outer surface of said central and said lower sections, each said channel having a longitudinally aligned locking bar disposed therein, each said locking bar having a proximal end and a distal end, each said locking bar further including outward extending blocking teeth compatible in size, shape, and spacing with said external threads on said body, said blocking teeth being attached to said locking bars such that when each said locking bar is moved longitudinally over said body, said blocking teeth may be moved between an aligned or offset position with said external threads on said body, each said locking bar being connected at said proximal end to said locking means so that when said locking means is moved between a locked and unlocked position, said blocking teeth on said locking bar are moved between said offset and aligned position with said external threads.

3. An attachable vehicle hand brake lock assembly, as recited in claim 2, wherein said lower section includes two outward biased clamping arms capable of being forced against the outer surface by said sleeve when said sleeve is moved downward on said body and over of said lower section.

4. An attachable vehicle hand brake lock assembly, as recited in claim 3, wherein said locking means includes a key lock, said key lock including means for connecting itself to said locking bars.

5. An attachable vehicle hand brake lock assembly, as recited in claim 4, wherein said means for connecting said key lock to said locking bars includes a transversely aligned gear capable of being interconnected to said locking bars.

6. An attachable vehicle hand brake lock assembly, comprising:
   a. a cylindrical-shaped body, said body having a longitudinal axis and a central passageway opened at one end manufactured therein, said body being of sufficient length and said passageway having sufficient diameter to enable said body to be placed over an upper end of a handle of a lever-type hand brake to cover a pushbutton release member located thereon, said body including an upper section, a central section, and a lower section, said central and lower sections having external threads formed thereon, said lower section being inwardly deformable and capable of being forced inward against the outer surface of said handle placed inside said passageway to securely hold said body thereon;
   b. a plurality of longitudinal channels manufactured on the outer surface of said central and said lower sections of said body;
   c. a locking means housed inside said upper section of said body, said locking means capable of being selectively moved between an opened or closed position;
   d. a sleeve capable of being rotatably attached to said external threads on said central and lower sections of said body, and;
   e. a locking bar disposed in each said channel, said locking bars capable of being interconnected with said locking means so that when said locking means is moved between an opened or closed position, each said locking bar may be moved longitudinally in said channel between one of two possible positions, each said locking bar having a distal end with a plurality of outward extending blocking teeth formed thereon complementary in size, shape and spacing with said external threads.

7. An attachable vehicle hand brake lock assembly, as recited in claim 6, wherein said lower section includes two outward biased clamping arms capable of being forced against the outer surface when said sleeve is moved downward over said lower section.

8. An attachable vehicle hand brake lock assembly, as recited in claim 7, wherein said locking means includes a key lock, said key lock including means for connecting said key lock to said locking bars.

9. An attachable vehicle hand brake lock assembly, comprising:
   a. a cylindrical-shaped body, said body having a longitudinal axis and a central passageway opened at one end manufactured therein, said body being of sufficient length and said central passageway having sufficient diameter to enable said body to be placed over an upper end of a handle of a lever-type hand brake to cover a pushbutton release member located thereon, said body including an upper section, a central section, and a lower section, said central and lower sections having external threads formed thereon, said lower section having two outward biased, inwardly deformable clamping arms capable of being forced inward against the outer surface of said handle placed inside said passageway to securely hold said body thereon;
   b. a plurality of longitudinal channels manufactured over the outer surface of said central and said lower sections of said body;
   c. a sleeve capable of being rotatably attached to said external threads on said central and lower sections of said body;
   d. a locking bar disposed in each said channel, said locking bars capable of being moved longitudinally in said channel between one of two possible positions, each said locking bar having a distal end with a plurality of outward extending blocking teeth formed thereon complementary in size, shape and spacing with said external threads, and;
   e. a key lock housed inside said upper section of said body, said key lock capable of being selectively moved between an opened or closed position, said key lock including means for connecting said key lock to said locking bars so that when said key lock is moved to an opened position, said locking bars are positioned so that said blocking teeth are aligned with said external threads on said body to allow rotation of said sleeve over said body or when said key lock is moved to a closed position, said blocking teeth are offset with said external threads thereby preventing said sleeve from rotating on said body.

* * * * *